3,702,314
TRACING PRODUCT MIXTURE COMPRISING AN OLEFINIC POLYMER, AND ETHYLENE VINYL ACETATE COPOLYMER AND A HIGH BOILING SOLVENT
Raymond Farjon, Neuilly, Jacques Farce and Jacques Florent, Boulogne-sur-Mer, and Michel Dumoulin, Saint-Martin-les-Boulogne, France, assignors to Baignol & Farjon S.A., Boulogne-sur-Mer, Pas-de-Calais, France
No Drawing. Filed Dec. 7, 1970, Ser. No. 95,866
Claims priority, application France, June 10, 1969, 6919141
Int. Cl. C08f 29/12
U.S. Cl. 260—23 H                                                8 Claims

ABSTRACT OF THE DISCLOSURE

Mixtures based on thermoplastic materials for the manufacture of tracing products such as crayons and chalks, comprising olefinic polymers, 5–15% of ethylene-vinyl acetate copolymers and 5–15% of high boiling esters. The mixtures may also contain petroleum waxes, metal salts of fatty acids, epoxy resins, pigments, and fillers. The mixture may be injected-molded and may be enclosed in a molded sheath.

---

The present invention relates to mixtures on a basis of thermoplastic materials, suitable for the manufacture of tracing products, such as crayons or chalks, which can be used to write and draw upon different substrates.

Tracing products constituted by mixtures having a thermoplastic material base are known. The commercially available articles of this kind are generally constituted by mixtures containing olefinic polymers, in particular polyethylene, as well as lubricants, mineral fillers and pigments. The lubricants utilised may be waxes, in particular petroleum waxes which are compatible with polyethylene, that is to say which form homogeneous mixtures therewith, or metal salts of fatty acids. In mixtures of this kind, the tracing property is due to the presence of the lubricants and increases as the proportion of lubricant increases. However, as the proportion of lubricant is increased, so the product, once applied, becomes progressively more difficult to erase.

An object of the present invention is to provide mixtures which have high spreading performance and which leave lines that can easily be erased.

The mixtures in accordance with the present invention comprise at least one olefinic polymer, 5 to 15% by weight of at least one ethylene and vinyl acetate copolymer and 5 to 15% by weight of at least one ester with a high boiling point.

In these mixtures, the high boiling point esters are rendered compatible with the olefinic polymers by the presence of the ethylene and vinyl acetate copolymers. The higher the proportion of copolymers, the higher can be the proportion of high boiling point esters in the mixture. Preferably these two constituents are used in substantially equal quantities.

The high boiling point esters make it possible to achieve a good tracing performance and prevent the mixtures from sticking to the substrate. Thus, it merely requires a light rub to lift away, in the form of shavings, the scaly films left behind on the substrate, whereas the known products tend to smear when rubbed.

Examples of high boiling point esters are:

Phthalic acid esters of alcohols having at least four carbon atoms, for example monobutyl phthalates, monocyclohexyl phthalates, methyl-cyclohexyl phthalates, monooctyl phthalates, dioctyl phthalates and dodecyl phthalates;

Alcohol triphosphates having at least four carbon atoms, for example tricresyl, tributyl and triphenyl phosphates;

Other esters having a high number of carbon atoms, for example octyl and cyclohexyl adipates, butyl salicylates, butyl tartrates and octyl stearates.

Compounds such as dioctyl phthalate, tricresyl phosphate and octyl stearate, will be found suitable in the majority of applications.

Preferred examples of ethylene and vinyl acetate copolymers are those in which 20 to 50% of the total weight is represented by vinyl acetate. The copolymer is chosen having regard to the application envisaged and the quantity of high boiling point ester which it is desired to incorporate into the mixture. A high vinyl acetate percentage in the copolymer makes it possible to incorporate a large quantity of ester. However, in order that the mechanical properties of the products shall be good, the percentage of vinyl acetate should not be too high. A copolymer with 72% ethylene and 28% vinyl acetate is suitable for a wide range of applications and can to a large extent be used to replace the olefinic polymers since it confers adequate mechanical properties on the mixtures. However, it is sometimes desirable to associate the high boiling point ester with a small quantity of a copolymer having a higher vinyl acetate percentage, for example 40%, in order to ensure compatibility between the components during the course of manufacture.

The olefinic polymers can be polyethylenes produced under high pressure. In particular, they can be polyethylenes of medium molecular weight, around 12,000 to 30,000, where the majority of applications are concerned. These polymers have a relatively low melting point (105 to 110°) and a low viscosity in the molten condition, which facilitates mixing. It is also possible to employ polyethylenes of higher molecular weights, and polypropylenes.

The percentage of olefinic polymers in the mixture depends upon the application envisaged. Thus, for the manufacture of articles of the crayon type, olefinic polymers are preferably incorporated into the mixture in a proportion of between 25 and 40% in relation to the total weight. By contrast, for the manufacture of chalks, the percentage of olenfinic polymers is preferably less than 15% of the total weight of the mixture.

As a lubricant, one or more petroleum waxes and/or one or more metal salts of fatty acids can be used. Examples of petroleum waxes are parafin waxes whose melting point is between 50 and 60°, microcrystalline waxes whose melting point is between 60 and 70° and chlorinated petroleum waxes. The petroleum waxes can be incorporated in a proportion of 15 to 30% of the total weight.

The metal salts of fatty acids are preferably alkali metal and alkaline earth metal salts of the fatty acids which are present in the form of glycerides in natural fats, particularly metal salts of stearic acid and oleic acid. They can be incorporated into the mixture in proportions which are preferably less than 20% of the total weight.

There can also be incorporated into the mixture various other substances which have been rendered compatible by the presence of the high boiling point esters, e.g. in proportions of up to 10% of the total weight.

Thus, one or more epoxy resins can be added; a resin of this kind reduces the adhesion of the mixture to the substrate and thus facilitates erasure. When the mixture is injection-moulded, it facilitates removal from the mould. It may also act as a solvent for certain colouring materials. Finally, it eliminates electrostatic charges, thus preventing the adhesion of dust particles to the manufactured products. Examples of epoxy resins are the "Scurols" manufactured by the company Rhone-Poulenc and the "Emkapols" manufactured by Kuhlmann.

"Scurol" is a condensation product of ethylene oxide on an aromatic radical having a molecular weight of about 7,000, a melting point range of 48–52° C. and a density of 1.09 at 70° C.

"Emkapols" have the formula $$CH_2OH—(CH_2OCH_2O)_n—CH_2OH$$

are polyethylene glycols—condensation products of ethylene oxide and glycol. They can vary in composition due to the condensation degree and exist in liquid, pasty or solid forms. The materials are also soluble in water, polar solvents and aromatic solvents. They are insoluble in aliphatic hydrocarbons.

Examples of other ingredients which may be added are stearamides which produce a bright, hard finish, silicones which make it possible to write on the skin, and plastic materials which improve the shock-resistance of the products.

Mineral or organic pigments can be incorporated in amounts of up to 10% of the total weight.

Mineral fillers (such as talc, kaolin, titanium dioxide and lithopone) can be incorporated in quantities which vary with the intended application. For articles of the crayon type, the proportion may be for example, about 15%, whereas for articles of the chalk type, it may be about 40%.

It is also possible to incorporate into the mixture perfumes and perfume bases, for imparting additional attraction to the products, especially for children.

The mixtures can be produced in a heated mixer. The various constituents can be introduced in the following way:

At a temperature of about 125° C. the petroleum waxes and then the olefinic polymers are introduced, after which there is added to the homogeneous molten mixture 50% of the ethylene and vinyl acetate copolymers. The rest of the copolymers, which have previously been mixed with the high boiling point esters and with other ingredients such as epoxy resins, are added subsequently at a temperature of about 115°. After this, the metal salts of fatty acids and the mineral fillers are added. Finally, the temperature is reduced to 110° C. and the pigments are added.

When the mixture is completely homogeneous it is cooled to about 90° C. and cast in slabs. After complete cooling, the slabs are crushed.

The products thus obtained can be extruded or injection-moulded.

Extrusion can be carried out in water; the exit velocities may vary from 6 to 15 m./min. However, it is then necessary to cut to length, polish (because it is difficult to obtain a satisfactory surface finish directly), cut a point and possibly mark the product. On the other hand, injection-moulding produces a finished product directly.

It is also possible to use injection-moulding to apply a thin sheath of a thermoplastic material around the moulded tracing product, for example a sheath of polyethylene which is sufficiently soft to be easily cut at this thickness. This operation enables the diameter of the tracing product to be reduced whilst imparting good mechanical properties to the moulded article.

The mixtures in accordance with the invention make it possible to produce varied tracing products, depending upon the compositions employed. The following examples of compositions illustrate the various ways in which the mixtures in accordance with the invention can be applied. In the examples and elsewhere in this specification percentages and other proportions are by weight.

SCHOOL CRAYONS

| | Percent |
|---|---|
| High pressure polyethylene (mean molecular weight about 25,000 to 30,000) | 32 |
| Petroleum waxes (80% paraffin and 20% microcrystalline wax) | 23 |
| Ethylene and vinyl acetate (72/28) copolymer | 10 |
| High boiling point ester (dioctyl phthalate or tricresyl phosphate) | 10 |
| Epoxy resin ("Scurol" of Rhone Poulenc) or stearamide [1] | 4 |
| Calcium stearate | 10 |
| Talc | 5 |
| Pigment | 6 |

[1] The stearamide is preferably used when tricresyl phosphate is employed as the high boiling point ester.

WAX CRAYONS

| | Percent |
|---|---|
| High pressure polyethylene (mean molecular weight about 12,000 to 15,000) | 30 |
| Petroleum waxes (80% paraffin and 20% microcrystalline wax) | 26 |
| Ethylene and vinyl acetate copolymers: | |
| 72–28 | 7 |
| 60–40 | 5 |
| High boiling point ester (dioctyl phthalate or octyl stearate) | 12 |
| Epoxy resin ("Scurol") | 5 |
| Calcium stearate | 10 |
| Pigment | 5 |

The epoxy resin can be partially substituted by one or more stearamides or one or more silicones.

INDUSTRIAL CHALKS

| | Percent |
|---|---|
| High pressure polyethylene (mean molecular weight about 25,000 to 30,000) | 36 |
| Petroleum waxes (70% paraffin and 30% microcrystalline wax) | 25 |
| Ethylene and vinyl acetate copolymer (72–28) | 6 |
| Octyl stearate | 6 |
| Stearamide | 2 |
| Calcium stearate | 10 |
| Talc | 5 |
| Titanium dioxide | 5 |
| Pigment | 5 |

In order to obtain pastel colours or pale colours, the talc can be omitted and the proportion of titanium dioxide increased.

All the above articles (crayons, wax crayons, industrial chalks), have good shock-resistance, can be handled without leaving any trace on the fingers and can easily be sharpened using a pencil-sharpner, for example. The traces they produce can be erased using an ordinary rubber eraser.

CHALKS FOR USE ON MAT SURFACES

| | Percent |
|---|---|
| High pressure polyethylene (mean molecular weight about 12,000 to 15,000) | 6 |
| Ethylene and vinyl acetate copolymers: | |
| 72–28 | 8 |
| 60–40 | 4 |
| Paraffin (melting point 50–52°) | 20 |
| Octyl stearate or dioctyl phthalate | 12 |
| Epoxy resin ("Scurol") | 8 |
| Titanium dioxide | 24 |
| Lithopone | 18 |

The products manufactured from this mixture are particularly well suited for writing on panels of a mat glass, a plastic material or a laminate.

CHALKS FOR USE ON ABRASIVE SURFACES

| | Percent |
|---|---|
| High pressure polyethylene (mean molecular weight about 12,000 to 15,000) | 8 |
| Ethylene and vinyl acetate copolymers: | |
| 72–28 | 10 |
| 60–40 | 4 |
| Paraffin (melting point 52–54°) | 20 |
| Octyl stearate or dioctyl phthalate | 15 |
| Epoxy resin ("Scurol") | 5 |
| Titanium dioxide | 20 |
| Lithopone | 10 |
| Precipitated calcium carbonate or silicon carbonate | 8 |

The products manufactured from this mixture are particularly suitable for writing on panels covered with an abrasive paint (blackboards) and upon slates.

The chalks referred to in the two preceding examples do not leave marks on the fingers and their traces can be removed using a cloth, without causing dust, in contrast to conventional chalks. Pigments can be incorporated into them to produce chalks of different colours.

All temperatures in the specification and claims are in degrees C.

What we claim as our invention and desired to secure by Letters Patent is:

1. A mixture for the manufacture of tracing products comprising:
   up to about 40% by weight of at least one olefinic polymer selected from the group consisting of polyethylene and polypropylene,
   5 to 15% by weight of at least one ethylene and vinyl acetate copolymer, and
   5 to 15% by weight of at least one ester with a high boiling point selected from the group consisting of monobutylphthalate, monocyclohexylphthalate, methyl-cyclohexylphthalate, monoctylphthalate, dioctylphthalate, dodecylphthalate, tricresylphosphate, tributylphosphate, biphenylphosphate, octyladipate, cyclohexyladipate, butylsalicylate, butyltartrate, and octylstearate.

2. A mixture as claimed in claim 1 in which said ethylene and vinyl acetate copolymer and said high boiling point ester are present in substantially equal quantities.

3. A mixture as claimed in claim 1 in which said ethylene and vinyl acetate copolymer comprises 20 to 50% by weight of vinyl acetate, based on the total copolymer weight.

4. A mixture as claimed in claim 1 in which said olefinic polymer is polyethylene obtained by a high pressure method.

5. A mixture as claimed in claim 1 in which the quantity of said olefinic polymer constitutes 25 to 40% of the total weight of said mixture.

6. A mixture as claimed in claim 1 in which the quantity of said olefinic polymer constitutes less than 15% of the total weight of said mixture.

7. A mixture as claimed in claim 1 which also contains at least one petroleum wax.

8. A mixture as claimed in claim 1 which also contains at least one metal salt of a fatty acid selected from the group consisting of alkali metal and alkaline earth metal salts of fatty acids.

References Cited

UNITED STATES PATENTS

| | | | |
|---|---|---|---|
| 3,386,936 | 6/1968 | Gordy et al. | 260—27 |
| 3,409,574 | 11/1968 | Gros | 260—23 |
| 3,533,976 | 10/1970 | Eidman | 260—28.5 |

DONALD E. CZAJA, Primary Examiner

D. J. BARRACK, Assistant Examiner

U.S. Cl. X.R.

260—28.5 A, 28.5 AV, 30.6 R, 31.2 R, 31.8 M, 41 R, 41 B, 41 C, 897 B; 264—275, 328

PO-1050
(5/69)

UNITED STATES PATENT OFFICE
CERTIFICATE OF CORRECTION

Patent No. 3,702,314          Dated November 7, 1972

Inventor(s) Raymond FARJON ET AL

It is certified that error appears in the above-identified patent and that said Letters Patent are hereby corrected as shown below:

Delete the claim to priority as shown in the heading of the patent.

Signed and sealed this 3rd day of April 1973.

(SEAL)
Attest:

EDWARD M. FLETCHER, JR.
Attesting Officer

ROBERT GOTTSCHALK
Commissioner of Patents